(12) United States Patent
Taylor

(10) Patent No.: US 8,573,244 B2
(45) Date of Patent: Nov. 5, 2013

(54) NON-SIMMER RELIEF VALVE

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 810 days.

(21) Appl. No.: 12/619,839

(22) Filed: Nov. 17, 2009

(65) Prior Publication Data

US 2010/0288960 A1 Nov. 18, 2010

Related U.S. Application Data

(60) Provisional application No. 61/178,523, filed on May 15, 2009.

(51) Int. Cl.
*F16K 17/14* (2006.01)
(52) U.S. Cl.
USPC ............ 137/70; 137/71; 137/624.27; 251/28; 251/63.4; 251/79; 251/282
(58) Field of Classification Search
USPC ........ 251/324, 336, 356, 359, 282, 12, 30.02, 251/62, 63, 63.4–63.6, 77, 79, 73, 74, 28; 137/624.27, 67, 68.11, 68.12, 70, 71, 137/73, 69, 68.17
See application file for complete search history.

(56) References Cited

U.S. PATENT DOCUMENTS

| | | | | |
|---|---|---|---|---|
| 4,463,929 A | * | 8/1984 | Dantlgraber et al. | ............ 251/44 |
| 4,549,565 A | | 10/1985 | Short, III | |
| 4,951,697 A | | 8/1990 | Fritts | |
| 5,685,329 A | * | 11/1997 | Taylor | .............................. 137/71 |
| 6,131,599 A | * | 10/2000 | DeGood et al. | .................. 137/70 |
| 6,325,088 B1 | * | 12/2001 | Scantlin | .......................... 137/70 |
| 6,431,196 B1 | | 8/2002 | Brazier et al. | |
| 7,438,087 B1 | | 10/2008 | Taylor | |

* cited by examiner

*Primary Examiner* — John K Fristoe, Jr.
*Assistant Examiner* — Marina Tietjen
(74) *Attorney, Agent, or Firm* — Hall Estill Attorneys at Law

(57) ABSTRACT

A relief valve assembly to relieve overpressure of a pressurized fluid. In accordance with some embodiments, the assembly comprises a housing with an inlet and an outlet to form a conduit for a pressurized fluid. A normally closed valve member is axially displaceable within the housing to engage a valve seat to prevent a flow of the pressurized fluid along the conduit. A biasing member applies a bias force to the valve member to retain the valve member against the valve seat. A piston within the valve member contactingly engages the pressurized fluid. A mechanically collapsible member resists axial movement of the piston responsive to said contacting engagement of the pressurized fluid. The piston and collapsible member decouple the bias force supplied by the biasing spring member upon the valve member from a force upon the valve member applied by the pressurized fluid, thereby maintaining a bubble-tight seal.

8 Claims, 4 Drawing Sheets

$X = Y$
$Z > X$
$F_{FV} \propto (Z - X)$

NON-SIMMER RELIEF VALVE

RELATED APPLICATIONS

This application makes a claim of domestic priority under 35 U.S.C. §119(e) to U.S. Provisional Patent Application No. 61/178,523 filed May 15, 2009.

BACKGROUND

Pressurized fluid systems are provided with pressure relief capabilities to prevent injury to personnel and damage to equipment. In the event of an overpressure condition, a pressure relief valve redirects the fluid flow to a bypass path or to a shut-off path. Pressure relief valves are usually configured to be either normally open or normally closed to fluid passage. Exemplary pressure relief valve assemblies are taught by U.S. Pat. No. 7,438,087 issued to Taylor.

Some types of pressure relief valves use a spring loaded valve member that is urged against a valve seat and configured to permit the pressurized fluid to contactingly engage the normally closed valve member. The spring maintains the valve member in the closed position, while the fluid pressure opposes the spring force to urge the valve member to the open position.

If the valve is operated at a working fluid pressure that is relatively close to the pressure setpoint, which is the pressure at which the valve will open to establish a bypass path, the net force applied to the valve member by the spring may be insufficient to maintain a bubble-tight seal. The valve will thus simmer, permitting small amounts of pressurized fluid to escape through the assembly. Depending on the nature of the pressurized fluid, this can result in a number of undesired effects including environmental contamination (pollution), loss of product volume and hazards to personnel and/or downstream equipment.

One way in which prior art solutions have endeavored to reduce the effects of simmering is to remove the valve member from the inlet fluid pressure through the use of an upstream rupture disk. The rupture disk generally serves as a membrane to isolate the downstream valve from normal fluid pressure. The rupture disk is intended to retain the fluid until the overpressure condition is reached, upon which the disk ruptures and the pressurized fluid passes to the pressure relief valve member. In such case, the fluid pressure is sufficient to overcome the spring bias force on the valve member, moving the valve member to the open position for fluid passage to a bypass path.

A limitation with this approach includes the fact that any fluid pressure that may develop between the upstream and downstream devices, such as via a leak through or around the rupture disk, will generally tend to alter the differential pressure across the upstream device. In such case, the set point at which the upstream device opens will be undesirably higher than the specified level.

It is thus common to use pressure indicators to detect such buildup of pressure between the upstream and downstream devices. When an undesirably high level of intermediate pressure is detected, maintenance action is required to address the situation, which can include replacing the upstream rupture disk, involving substantial effort and downtime to access and replace the failed rupture disk.

Another limitation associated with the use of rupture disks is the fact that while rupture disks are generally intended to open in a controlled manner and remain in a single piece, the disks can separate upon rupturing and fragments can be carried by the fluid flow to the main pressure relief valve. This is undesirable as such fragments can interfere with the proper opening and subsequent closing of the main valve.

There continues to be a need for improvements in the manner in which overpressure conditions in pressurized fluid system configurations can be detected and relieved. It is to these and other improvements that various embodiments of the present invention are generally directed.

SUMMARY

Various embodiments of the present invention are generally directed to a valve assembly that is configured to relieve an overpressure condition of a pressurized fluid when the fluid reaches a setpoint pressure, and to reduce the occurrence of simmering when the fluid is near the setpoint pressure.

In accordance with some embodiments, the valve assembly comprises a housing with an inlet and an outlet to form a conduit for a pressurized fluid. A normally closed valve member is axially displaceable within the housing to engage a valve seat to prevent a flow of the pressurized fluid along the conduit.

A biasing member applies a bias force to the valve member to retain the valve member against the valve seat. A piston within the valve member contactingly engages the pressurized fluid. A mechanically collapsible member resists axial movement of the piston responsive to said contacting engagement of the pressurized fluid.

The piston and collapsible member decouple the bias force supplied by the biasing spring member upon the valve member from a force upon the valve member applied by the pressurized fluid. In this way, a bubble-tight seal is maintained even if the working pressure of the fluid is just below the setpoint pressure at which the valve assembly opens.

Various other features and advantages of presently preferred embodiments present invention will be apparent from the following description when read in conjunction with the accompanying drawings and appended claims.

DETAILED DESCRIPTION

Various embodiments of the present invention are generally directed to an apparatus for detecting and abating an overpressure condition in a pressurized fluid. A normally closed valve assembly establishes a bubble-tight seal to impede a flow of pressurized fluid. The valve assembly opens when a predetermined setpoint pressure is reached. The occurrence of simmering of pressurized fluid through the closed seal interface is minimized, even if the operational pressure of the fluid is just below the setpoint pressure.

Figure 1:
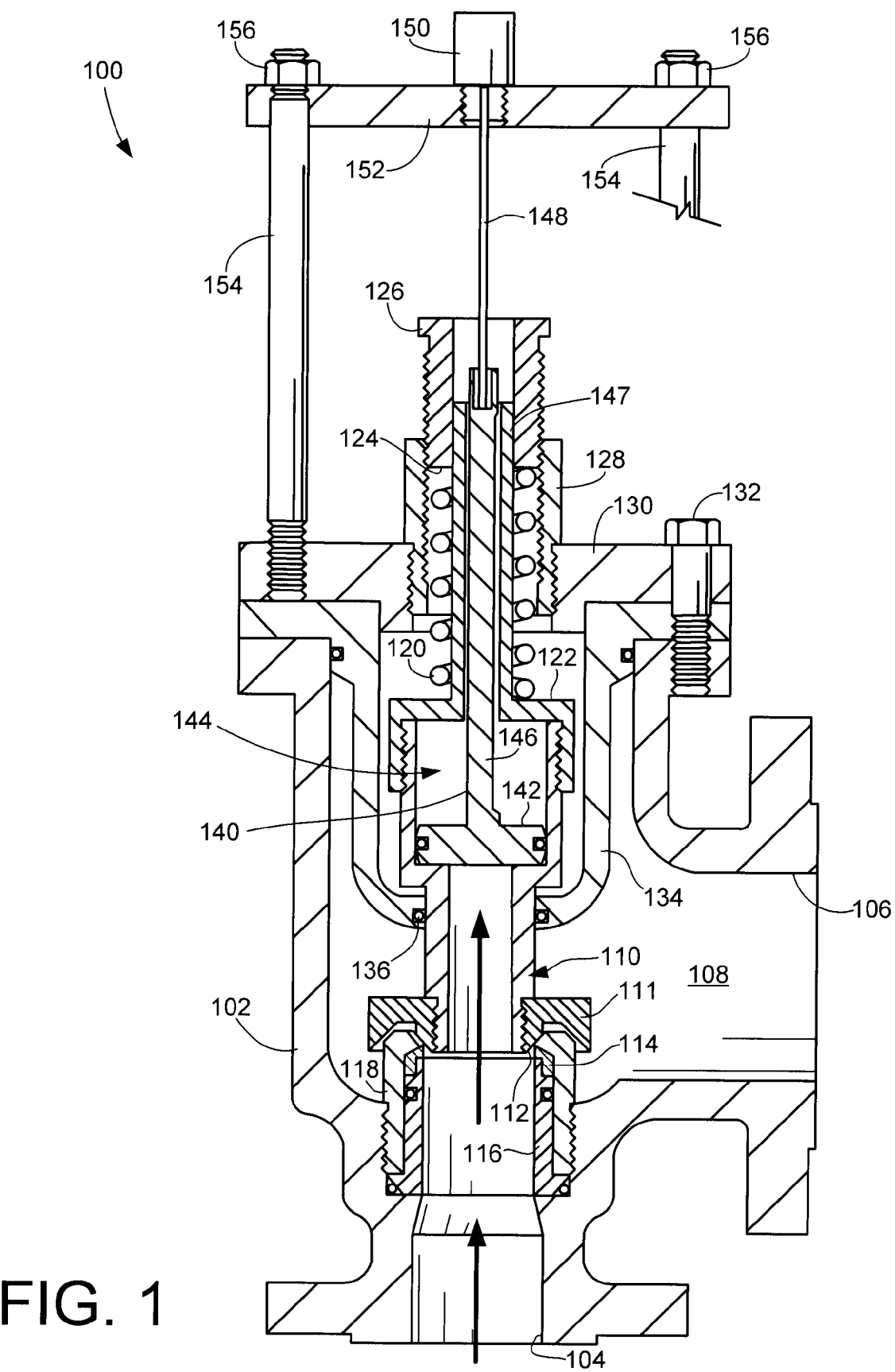
FIG. 1 shows an exemplary pressure relief valve assembly in a closed position to inhibit passage of a pressurized fluid.

FIG. 1 shows an exemplary pressure relief valve assembly 100. It is contemplated that the pressure relief valve assembly 100 is incorporated into a larger pressurized fluid transport system (not shown), such as a pipeline system.

Figure 2:
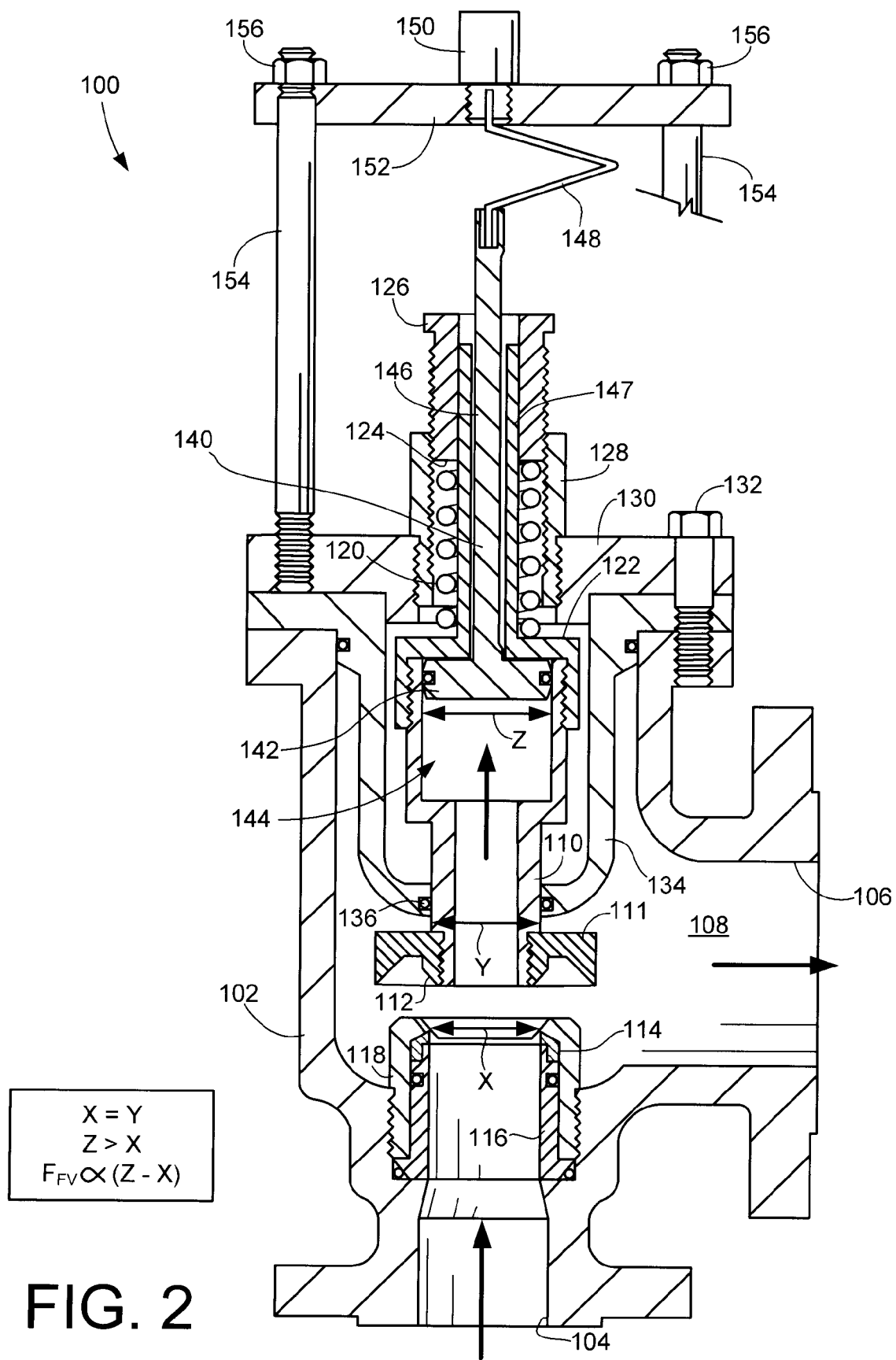
FIG. 2 shows the valve assembly of FIG. 1 in an open position to establish a bypass path for the pressurized fluid.

The pressurized fluid can take any number of forms such as but not limited to volatile hydrocarbons, steam, fuel oil, fresh or salt water, etc. Any number of working and setpoint pressures can be utilized depending on the requirements of a given application. The valve assembly 100 is maintained in a normally closed (NC) position during normal operation as depicted in FIG. 1. Once the pressure of the fluid reaches the predetermined setpoint pressure, the valve assembly 100 transitions to an open position as shown in FIG. 2 to provide a bypass path for the pressurized fluid.

A valve body 102 includes an inlet 104 and an outlet 106 to form an interior conduit 108. A valve member 110 is configured for reciprocal movement along a central axis through the body 102. The valve member 110 includes a main valve piston 111 with an annular valve engagement surface 112. The surface 112 engages an annular sealing member 114 to form a seal interface.

The sealing member 114, also referred to as a valve seat, can take any number of forms including metal, vulcanized rubber (with or without a reinforcing metal insert), nylon, or some other suitable material. The sealing member 114 is supported by a cylindrical insert 116 and an outer sleeve member 118.

A biasing member 120, characterized in FIG. 1 as a coiled spring, engages the valve member 110 to urge the annular valve engagement surface 112 against the sealing member 114 in a normally closed manner. The spring 120 is compressed between an upper surface 122 of the valve member 110 and a lower base surface 124 of a threaded first insert 126.

The first insert 126 engages a threaded second insert 128. The threaded second insert 128 engages a cover plate 130 which is secured to the valve body 102 via fasteners 132. A user can rotate the first insert 126 to axially advance or retract the lower base surface 124 toward or away from the valve member 110, thereby adjusting the net spring force magnitude imparted to the valve member 110. It is contemplated that this operation will take place during manufacturing testing and certification of the valve assembly, but subsequent field adjustments of the assembly can be carried out in this manner as well.

An interior carriage support 134 extends inwardly as shown to maintain the reciprocal movement of the valve member 110 along the desired axial path. A low friction sealing member 136, such as an annular o-ring, accommodates such axial movement while retaining the pressurized fluid within the conduit 108.

A reciprocating piston 140 engages the valve member 110. The piston 140 includes a piston head 142 housed within a piston head chamber 144 of the valve member 110, and an upwardly depending piston stem 146 that extends through a tube extension 147 of the valve member 110.

A distal end of the piston stem 146 is coupled with a first end of a collapsible member 148, characterized as a buckling pin. An opposing second end of the collapsible member 148 is secured by a threaded cap nut 150, which is supported by a top plate 152. The top plate 152 is supported above the cover plate 130 via threaded standoffs 154 and threaded nuts 156.

The piston 140 and the pin 148 decouple the fluidic force of the pressurized fluid from the spring force supplied by the spring 120, allowing the entire force of the spring to be maintained upon the valve member 110 at all times. This advantageously reduces, or wholly eliminates, any simmering of the pressurized fluid through the seal interface while the valve member 110 remains in the closed position, even when the working pressure is very close to setpoint (e.g., within 2% or less).

In at least some embodiments, the diameter of the cross-sectional opening of the seal 114, denoted as distance X in FIG. 2, is nominally set to be equal to the outer diameter of a medial portion of the valve member 110 (shown as distance Y in FIG. 2, so that X=Y). The effective diameter of the piston head 142, shown as distance Z in FIG. 2, is set to be greater than the diameter X of the seal 114 (i.e., Z>X).

Because of the balanced X=Y condition, upon collapse of the pin 148 (FIG. 2) any downstream fluidic pressure at the outlet 106 will tend to have no effect on the effective spring force on the valve member 110. That is, to the extent that there is any fluid pressure at outlet 106, this pressure will exert both upwardly and downwardly directed forces upon the valve member 110, and these fluidic forces will be nominally equal and will cancel one another. The valve assembly will thus open as the larger upwardly directed fluidic pressure force $F_P$ upon the piston overcomes the smaller downwardly directed spring force $F_B$ upon the valve member ($F_P > F_B$).

Because of the unbalanced Z>X condition, while the valve member remains in the closed position (FIG. 1) there will be a net force $F_V$ from the pressurized fluid that aids the spring force $F_B$ in holding the valve member 110 against the seal 114. This net force $F_V$ will be proportional to the difference between the larger diameter of the piston head 142 and the smaller diameter of the seal 114 (i.e., $F_V \alpha$ Z−X). This net force will be applied downwardly upon the valve member 110 just below the piston head 142 in the gap between the piston head and the valve member (see FIG. 1).

Once the pin 148 buckles, the piston 140 will be driven upwardly against the valve member 110 and will effectively become a "part" of the valve member 110. At this point the spring 120 will be the only member operating to maintain the valve member 110 on the seal 114, as the net fluidic forces upon the valve member 110 will be balanced as discussed above.

Figure 3:
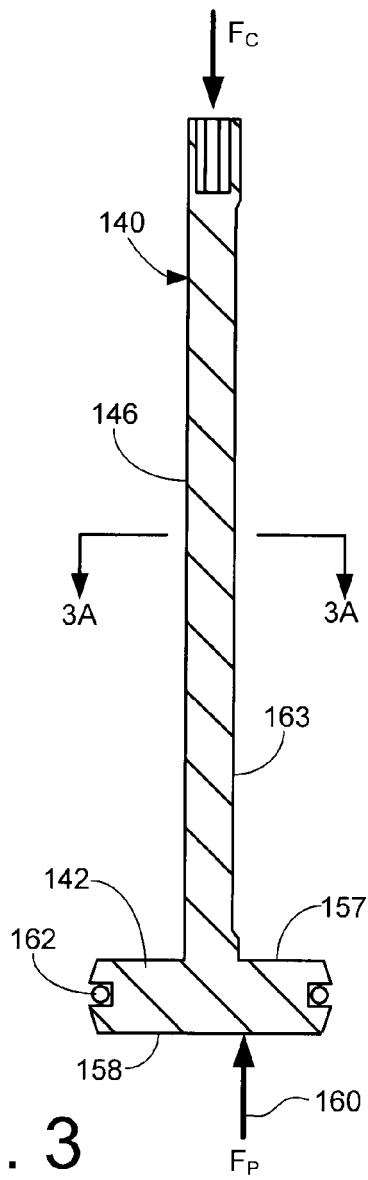
FIG. 3 shows an elevational representation of a piston of the valve assembly of FIG. 1.
Figure 3A:
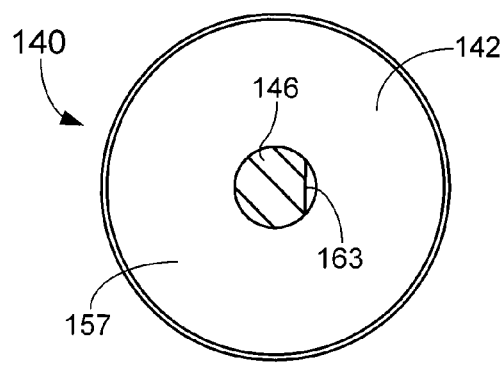
FIG. 3A shows a bottom plan, partial cross-sectional representation of the piston as viewed along line 3A-3A in FIG. 3.

FIG. 3 is an elevational representation of the piston 140. FIG. 3A shows an end view of the piston along line 3A-3A in FIG. 3. The piston head 142 includes opposing upper and lower surfaces 157, 158. The lower surface 158 is configured to receive contacting engagement of a portion of the pressurized fluid. The fluid force $F_P$ upon the piston 140, denoted in FIG. 3 by vector arrow 160, will be provided in relation to the pressure of the fluid and the areal extent of the piston lower surface 158.

This force will be opposed by the collapsible member 148 (see FIG. 1), which will resist movement of the piston 140 via a compression force $F_C$ until the member mechanically collapses in accordance with Euler's Law of Axial Loading (see FIG. 2). As used herein, mechanical collapse will be understood as a permanent deformation of the collapsible member so that the member is altered to take a different shape.

An annular sealing member 162 is disposed within an annular recess of the piston head 142, as shown in FIG. 3. The piston stem 146 includes a notched surface 163 to provide a generally D-shaped cross-sectional shape for the stem, as shown in FIG. 3A. This provides a vent path for entrapped air as the piston 140 is driven upwardly.

Figure 4:
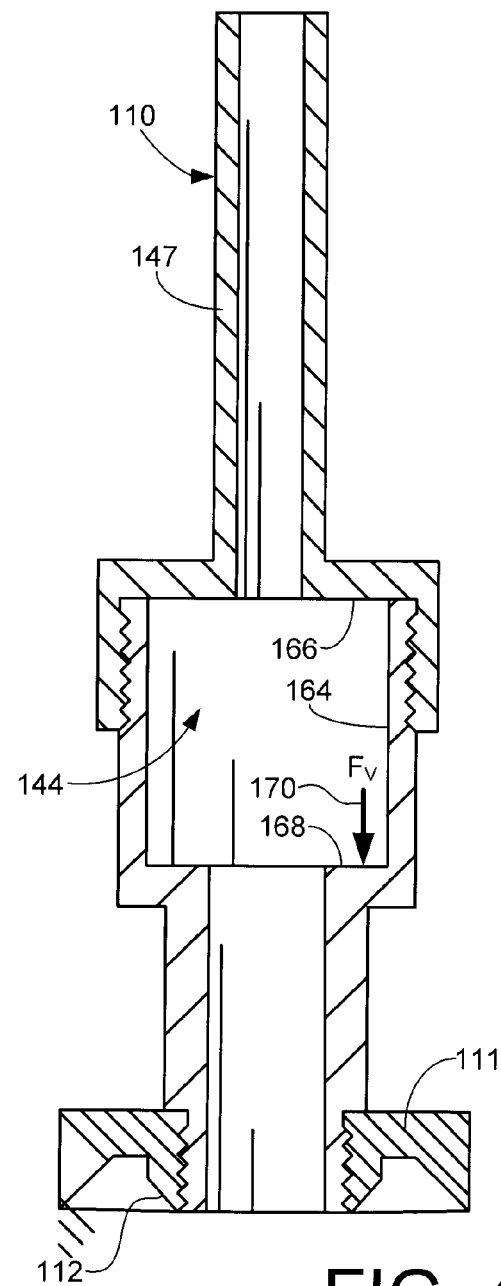
FIG. 4 is an elevational, cross-sectional representation of a valve member of the valve assembly.

FIG. 4 shows the valve member 110 in greater detail. The aforementioned piston chamber 144 includes an annular sidewall 164 and opposing upper and lower circumferentially extending surfaces 166, 168.

The annular sealing member 162 of the piston head 142 (see FIG. 3) establishes a fluidic seal against the annular sidewall 164. The upper surface 157 of the piston head 142

(FIG. 3) contactingly abuts the upper surface 166 when the pin 148 collapses and the piston 140 is driven upwardly, as in FIG. 2. A portion of the pressurized fluid exerts the downwardly directed force $F_V$ (arrow 170) upon the lower surface 168 to urge the valve member 110 against the seal 114 when the valve assembly is closed, as in FIG. 1. The total net force holding the valve member 110 on the seal 114 is thus generally equal to $F_B+F_V$.

Figure 5:
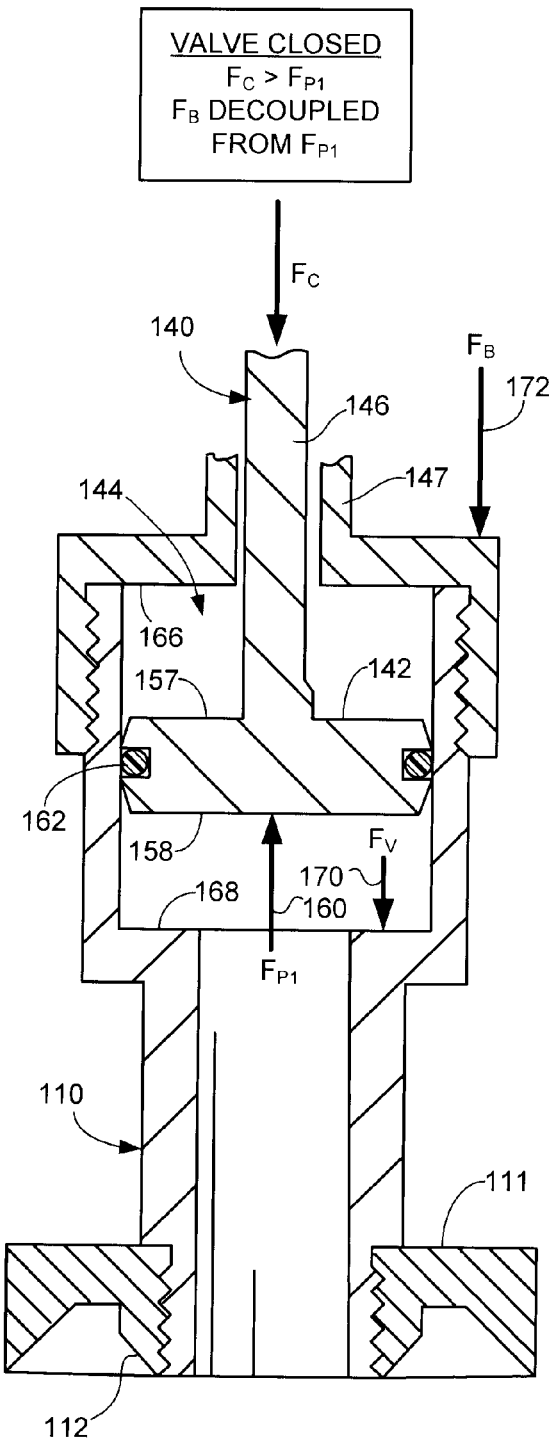
FIG. 5 shows a relative orientation of the piston and valve member when the valve assembly is in the closed position.
Figure 6:
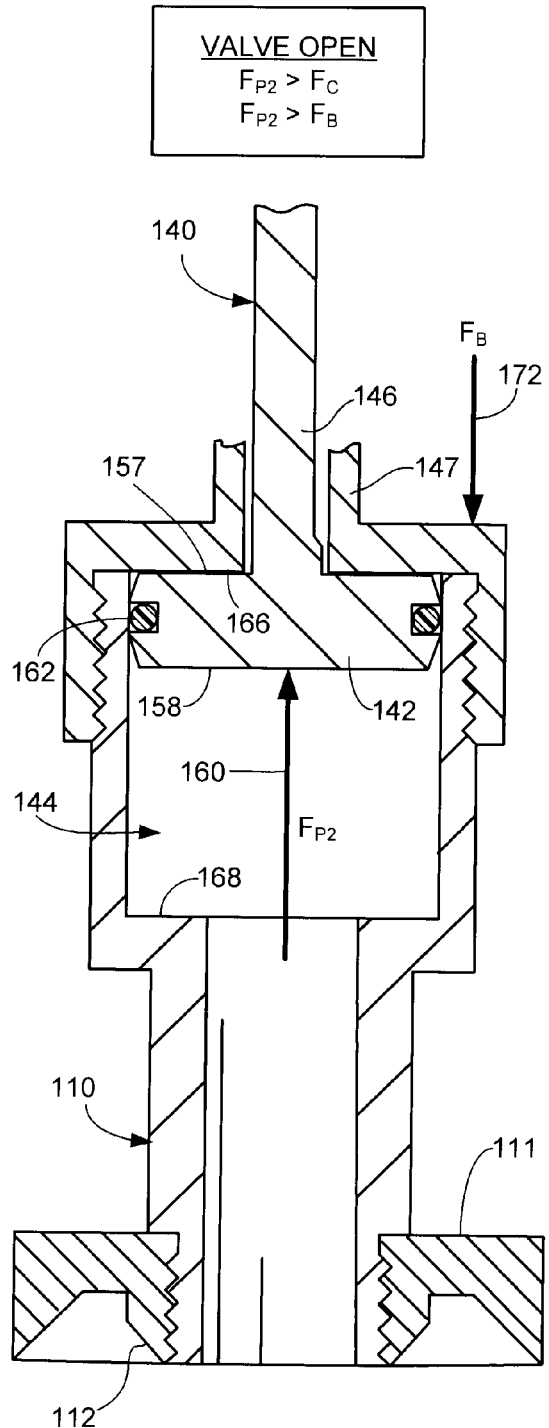
FIG. 6 shows a relative orientation of the piston and valve member when the valve member is in the open position.

FIGS. 5 and 6 show the piston 140 in conjunction with the valve member 110 during respective closed and open positions of the valve assembly 100. While FIG. 5 shows the piston 140 to be in a medial portion of the piston chamber 144, the starting location of the piston 140 could be anywhere along the vertical extent of the chamber so long as the upper surface 157 of the piston head 142 is not in contact with the upper surface 166 of the chamber 144. Preferably, the piston head 142 will be initially located near the lower surface 168 of the chamber 144, as depicted in FIG. 1.

In FIG. 5, the piston head 142 divides the piston chamber 144 between a lower chamber portion and an upper chamber portion. The lower portion is filled with the pressurized fluid, and the upper chamber portion encloses atmospheric air vented to the surrounding atmosphere along the stem 146.

As noted above, while in the closed position the inlet fluid will impart the aforementioned fluidic force 160 upwardly upon the piston 140, in opposition to the compression force $F_C$ of the pin 148. This force is denoted as $F_{P1}$ in FIG. 5. It will be contemplated that the setpoint pressure of the pressurized fluid that causes collapse of the pin 148 equates to an associated setpoint force $F_S$. Because the valve remains closed, $F_{P1}$ is necessarily less than $F_S$ (i.e., $F_{P1}<F_S$).

The spring 120 will impart the $F_B$ downwardly directed bias force (arrow 172) upon the valve member 110. A portion of the pressurized fluid will pass up into the lower chamber to impart the $F_V$ downwardly directed force (arrow 170) upon the valve member 110. While the valve remains closed, the $F_{P1}$ force remains decoupled from the $F_B$ and $F_V$ forces. Thus, the full spring force $F_B$ will be applied to retain the valve surface 112 against the seal 114 and no simmering will occur even if the working pressure (e.g., 150 psi) is very close to the set pressure (e.g., 152 psi).

In FIG. 6, the inlet fluid reaches a second, higher pressure that provides a fluidic force $F_{P2}$ that is greater than the setpoint force $F_S$ ($F_{P2}>F_S$) and thus is sufficient to collapse the pin 148 ($F_{P2}>F_C$). The piston 140 is driven upwardly so that the upper surface 147 of the piston head 142 contactingly engages the upper chamber surface 166 of the valve member 110. At this point, the piston 140 and the valve member 110 become coupled together as a single unit, and the entire unit advances upwardly as the $F_{P2}$ fluid force 160 overcomes the downwardly directed $F_B$ spring force 172 ($F_{P2}>F_B$).

It is contemplated that an upstream valve (not shown), such as a ported ball valve, can be provided in fluid communication with the inlet port 104 of the valve assembly 100. This upstream ball valve will normally remain open when the valve assembly 100 is in the closed position depicted in FIG. 1. When it becomes necessary to reset the valve assembly 100 from the open position of FIG. 2 back to the closed position of FIG. 1, the upstream ball valve can be manually closed, and the internal pressure in the valve assembly 100 can be vented to permit replacement of the damaged pin with a replacement pin.

Once the fluidic pressure has been reduced within the valve assembly 100, the spring 120 will drive the valve member 110 back on the valve seat 114. The piston 140 can be manually depressed down to the bottom of the piston chamber 144. The nut 150 (FIG. 1) can be removed, and the collapsed member 148 can be removed and replaced with a new collapsible member. The nut 150 can be reinstalled, and the upstream ball valve can be opened to return the valve assembly 100 to pressure service.

It will be appreciated that the various embodiments disclosed herein may provide a number of benefits over the prior art. The respective arrangement of the piston and the valve member decouples the valve member from the inlet fluid pressure, allowing the entire bias force supplied by the spring to maintain the valve member seated on the sealing member.

For example, if the spring is configured to supply 100 pounds of force against the valve member, this amount of force will be applied to maintain the valve closed, even if the fluidic pressure is close to setpoint. So long as the pressure of the fluid remains below the setpoint pressure, the pressure of the fluid is immaterial to the spring force, and will not operate to offset this spring force.

Indeed, the pressure of the fluid (so long as less than setpoint) may be used to further urge the valve closed as disclosed above for some embodiments. It is contemplated that the valve may be alternatively configured to be balanced in the closed position (by setting Z=X) so that the pressure of the fluid has no net effect upon the closed valve. Although not required, the spring and the collapsible member each may be individually set to operate at the desired setpoint pressure.

The various embodiments eliminate the need for the use of internally disposed collapsible members, such as rupture disks below the valve seat, and the associated requirement to sense and monitor the differential pressure thereacross. This also eliminates the need as in the prior art to disassemble the valve to access and replace a failed rupture disk or similar member after the valve assembly has been opened. Rather, the external location of the collapsible member in the various embodiments disclosed herein give an instant indication whether the valve has transitioned to the open position, and allows easy resetting of the valve in a matter of a few minutes.

The elimination of valve simmering provides significant environmental advantages, since small amounts of the pressurized fluid are not allowed to seep past the seal interface and contaminate the surrounding environment or interfere with downstream processing.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular environment without departing from the spirit and scope of the present invention.

What is claimed is:
1. A valve assembly comprising:
   a housing with an inlet and an outlet to form a conduit for a pressurized fluid;
   a normally closed valve member axially displaceable within the housing to engage a valve seat to prevent a flow of the pressurized fluid along the conduit;
   a biasing member which applies a bias force to the valve member to retain the valve member against the valve seat;
   a piston disposed within the valve member which contactingly engages the pressurized fluid; and a mechanically collapsible member coupled to the piston which resists axial movement of the piston responsive to said contacting engagement of the pressurized fluid, the piston and collapsible member decoupling the bias force supplied by the biasing member from the pressurized fluid, the collapsible member being a buckling pin coupled to the piston that is collapsed when the pressurized fluid reaches a predetermined pressure level, facilitating contacting engagement of the piston against the valve member and movement of the valve member away from the valve seat by the pressurized fluid in opposition to the biasing force supplied by the biasing member.

2. The valve assembly of claim 1 wherein the pressurized fluid contactingly engages the valve member with a net fluidic force that urges the valve member against the valve seat while the valve member is in a closed position thereagainst.

3. The valve assembly of claim 1 wherein the valve seat has a central opening with a cross-sectional diameter equal to an outermost diameter of a medial channel portion of the valve member.

4. The valve assembly of claim 1 wherein the biasing member comprises a spring that contactingly biases the valve member against the valve seat, wherein an entirety of the biasing force generated by the spring is applied to the valve member without being countered by an opposing force generated by contacting engagement of the pressurized fluid against the valve member while the valve member contactingly engages the valve seat.

5. The valve assembly of claim 1 wherein the piston is reciprocal within a piston chamber within the valve member, the piston having an outermost diameter greater than a cross-sectional diameter of a central opening of the valve seat through which the pressurized fluid flows when the valve member is moved to an open position.

6. The valve assembly of claim 1 wherein the pressurized fluid contactingly engages the valve member without reducing the bias force applied to said valve member by the biasing member.

7. The valve assembly of claim 1 wherein the valve member comprises a hollow longitudinally extending member forming a medially disposed piston head chamber, and wherein the piston has a piston head and a stem extending from the piston head, the piston head disposed for reciprocal movement in the piston head chamber and the distal end of the stem coupled with the collapsible member so that pressurized fluid urges the piston in a first direction and the collapsible member provides a corresponding force to urge the piston in an opposing second direction.

8. A pressure relief valve assembly configured to relieve an overpressure condition of a pressurized fluid, comprising:
a valve body having an inlet and an outlet;
valve means forming a normally closed seal interface for selectively opening or closing the outlet, the valve means comprising a valve member that is a hollow longitudinally extending member forming a medially disposed piston head chamber;
biasing means for urging the valve means to a seated position of the seal interface;
a piston supported in communication with the pressurized fluid and urged thereby in a first direction away from the interior of the valve body, the piston having a piston head and a stem extending from the piston head, the piston head disposed for reciprocal movement in the piston head chamber;
means adjacent the valve body for applying a corresponding force to urge the piston in a second direction opposing the first direction, the piston permitted to move in the first direction only when the pressurized fluid reaches a predetermined setpoint pressure, and wherein the piston upon movement in the first direction moves the valve means in opposition to the biasing force supplied by the biasing means to open the outlet to fluid flow, the means for applying the corresponding force comprises a collapsible member and wherein the distal end of the stem is coupled with the collapsing member that pressurized fluid urges the piston in the first direction and the collapsible member provides the corresponding force to urge the piston in the opposing second direction until collapsed.

* * * * *